United States Patent [19]

Udren

[11] Patent Number: 4,471,399
[45] Date of Patent: Sep. 11, 1984

[54] POWER-LINE BASEBAND COMMUNICATION SYSTEM

[75] Inventor: Eric A. Udren, Monroeville, Pa.

[73] Assignee: Westinghouse Electric Corp., Pittsburgh, Pa.

[21] Appl. No.: 357,239

[22] Filed: Mar. 11, 1982

[51] Int. Cl.³ .................. H04B 1/60; H02H 7/26; H04M 11/04
[52] U.S. Cl. ..................................... 361/64; 361/66; 361/68; 361/81; 340/310 A
[58] Field of Search ................ 361/62, 64, 66, 68, 361/81; 340/310 A

[56] References Cited

U.S. PATENT DOCUMENTS

| | | | |
|---|---|---|---|
| 2,996,578 | 8/1961 | Andrews, Jr. | 178/70 |
| 3,509,537 | 4/1970 | Haberly | 340/310 A |
| 3,643,160 | 2/1972 | Roy et al. | 361/68 X |
| 3,688,036 | 8/1972 | Bland | 178/68 |
| 4,040,046 | 8/1977 | Long et al. | 340/310 A X |
| 4,194,182 | 3/1980 | Martin | 340/310 R |
| 4,205,360 | 5/1980 | Drucker | 361/64 X |
| 4,293,846 | 10/1981 | Allison | 340/310 A |
| 4,322,768 | 3/1982 | Meada et al. | 361/64 |

FOREIGN PATENT DOCUMENTS 440383  7/1967  Switzerland .

OTHER PUBLICATIONS

IEEE Conference Record, 1976 National Telecommunication Conference, vol. 1, Dallas, TX, 11/29/76.

Primary Examiner—Joseph W. Hartary
Assistant Examiner—Derek Jennings
Attorney, Agent, or Firm—D. R. Lackey

[57] ABSTRACT

A communication system for transmitting baseband digital signals on an electrical power line. A pulse generator produces digital signals which are limited to a frequency spectrum of 30 kHz to 300 kHz and applied directly, i.e., without modulation, to an electrical power line. At the receiving terminal an amplifier compensates for attenuation characteristics of the electrical power line and the received signal is then sampled to extract the information from it. To avoid interference when both a transmitting and receiving link are located at a substation, the baseband system incorporates a mimic network to mimic the interference signal erroneously picked up by the receiving link from the transmitting link located at the same substation. The mimic signal is then subtracted from the interference signal to neutralize the effect of the latter. When both a baseband digital communication system and a carrier communication system utilize the same electrical power lines, provision is made for interrupting the baseband digital signal to allow communications via the carrier system.

36 Claims, 8 Drawing Figures

POWER-LINE BASEBAND COMMUNICATION SYSTEM

BACKGROUND OF THE INVENTION

1. Field of the Invention

This invention relates in general to power-line communication systems and, more specifically, to such communication systems employing baseband digital communication techniques.

2. Description of the Prior Art

Today's electric power systems for generating and transmitting electricity consist primarily of generating units, transmission lines, and major switching substations all interconnected in a giant electrical grid extending for hundreds of miles. Power is taken from the grid at the major substations where it is fed to an intricate distribution network. Finally, branches of the distribution network provide the electric power to the customer's premises. Centralized monitoring and controlling of the entire generation and transmission system is essential to satisfy the many operational goals of the system. Included among these objectives are: analysis and prediction of load flow among system elements, economical control of power flow and generation, network switching to minimize the impact of unexpected outages, and prediction of the effects of various switching operations on network stability and security. Achievement of these objectives necessitates the use of a large central computer constantly receiving data from diverse locations on the power grid and responding with appropriate control signals.

The system for performing centralized control of a power network is often referred to as the supervisory control and data acquisition (SCADA) system or the energy management system (EMS). Typically, the elements of an EMS include: a central computer, data and voice communication channels connecting the computer with each of the generating plants and major switching stations, and a remote terminal unit (RTU) at each generating and switching station. The remote terminal unit monitors apparatus as its location, digitizes analog measurements, transmits data to the computer, and receives and executes computer commands.

Three communication schemes are in wide use today for connecting the EMS central computer with the RTU's. Utilities use leased or dedicated telephone lines, private multiplexed microwave system, or power-line carrier communication systems. Each of these communication techniques is discussed in detail and compared to the novel power-line baseband communication system hereinbelow.

Many electric utilities use dedicated telephone circuits, leased at considerable expense from the local telephone company, as communication channels for EMS purposes. The EMS digital messages are converted to or from modulated audio-frequency carrier signals by modems at each end of the telephone line. These modems typically communicate at 1200 to 4800 bits per second on each line. The utility user provides special interface facilities for the mutual protection of the utility's modems and the telephone plant; the lessor is responsible for other aspects of service quality and circuit maintenance.

Today, an increasing number of energy management systems employ multi-link microwave systems which are planned, purchased, installed, and maintained by the utility user. Although quite costly, a microwave system provides ample capacity for present and future utility needs. Discrete audio-frequency channels, similar in characteristics to telephone circuits, are multiplexed by tens or hundreds into a single microwave system. Voice signals may be transmitted directly; data are transmitted via modems similar to those used with leased telephone lines. The user has complete control over the system, but also assumes responsibility for maintenance, notably including repeater installation. The repeaters are frequently required at remote locations having difficult access not otherwise needed for utility operations.

The third alternative, a power-line carrier communication system, involves the transmission of longwave carrier-modulated signals directly over the power transmission line. System transmitters generally operate at a carrier frequency in the range of 30 kHz to 300 kHz. Frequencies below 30 kHz are unusable due to the difficulty of building associated equipment to operate below this limit. There is also a substantial increase in received noise power below 30 kHz. Frequencies greater than 300 kHz suffer substantial signal attenuation on the line and increased radiation of the carrier signal, raising the possibility of interference with long-wave radio services. For operation in the 30–300 kHz range the radio frequency output power of these carrier transmitters is typically 1 watt or 10 watts. For critical applications in high-noise environments 100-watt transmitters have been used. Simple modulation schemes are generally employed, i.e., on-off keying or frequency-shift keying. Each modulated carrier signal typically occupies approximately 3 kHz of the frequency spectrum thereby permitting, in theory, multiplexing of approximately 90 individual signals in the 30 kHz to 300 kHz band. Practical problems of adjacent channel interference usually limit this number to much less than 90.

The power-line carrier communication receiver must have the following characteristics for proper detection of the carrier: adequate selectivity, long-term reliability, and reasonable security against inadvertent operation or reception errors due to line noise or switching transients. Of course, the power level of the received signal must be substantially greater than the noise power on the transmission line to allow proper reception and demodulation.

Other components of the power-line carrier communication system include: a coupling capacitor to couple the carrier signal to the energized transmission line while protecting carrier equipment and personnel from large 60 Hz voltages on the line; line traps inserted on the transmission line to prevent any portion of the transmitted signal from propagating to other transmission lines via a power bus to which several transmission lines are connected, and to prevent faults on the power bus or other transmission lines from shorting the carrier signal; and matching networks to match, in conjunction with the coupling capacitor, the nominal transmitter and receiver impedance to the power line characteristic impedance. In a typical power line carrier communication system installation a transmitter, a receiver, and their associated components are connected at each terminal of the transmission line.

In recent years, use of the power-line carrier technique as the communication link in the EMS has diminished. Although it provides a highly reliable, utility-controlled medium for EMS data transmission, it is not often utilized in new installations because of the lack of adequate carrier spectrum for providing needed data transmission capacity to a large number of substations and generating plants. The increasing use of carrier for protective-relaying signals accentuates this shortage. Before discussing the application of power-line carrier communication to protective relaying, it is necessary to understand protective relaying fundamentals.

Electrical transmission lines and power generating equipment must be protected against insulation faults and consequent short circuits which could cause collapse of the power system, serious and expensive apparatus damage, and personal injury. For instance, such a fault condition is caused by lightning-induced flashover from a transmission line to ground or between adjacent transmission line conductors. Under such a faulted condition, line currents can increase to several times the normal value thereby causing loss of synchronism among generators and damaging or destroying both the transmission line and the attached equipment. To avoid equipment damage and collapse of the entire power system, faulted apparatus on the main transmission line must be isolated from the network in the range of 0.1 to 0.5 seconds. The isolation time limit must allow for the operation of large circuit breakers interrupting up to 80,000 A and the completion of backup operations if these primary protective devices fail to function properly. To allow sufficient time for circuit interruption, location of the fault must be determined in approximately 8 ms to 20 ms. It is the function of the protective relays, which monitor ac voltages and currents, to locate line faults and initiate via tripping of appropriate circuit breakers. These faults are located by detection of abnormal relationships of ac voltages and currents.

Protective relay systems for transmission lines consist of measurement apparatus at each transmission-line terminal or substation and bidirectional communication links connecting the relays. The devices at each transmission-line terminal compare fault location information to quickly determine if the line fault is on that segment of the transmission line between them. If the comparison indicates that the detected fault is internal, i.e., between the two protective relays, the intervening transmission-line section is isolated by tripping associated circuit breakers. If the comparisons indicate that the fault is not between the two protective relays, the circuit breakers remain closed. This protection technique is known in the art as pilot relaying.

The power-line carrier communication system, previously discussed for use on an EMS, initially evolved for use as a bidirectional communication channel of a protective-relaying network. A power-line carrier receiver and transmitter, and their associated equipment, are connected to each protective relay to serve as an incoming and outgoing communication link. Since the percentage of time during which faults are actually present on the line is small, the transmitters and receivers are often equipped with auxiliary voice modulation and demodulation equipment to provide voice channel communication between the substations where the protective relays are located. The system will interrupt voice channel communications if a power-line fault occurs during a conversation. A power-line carrier communication system for protective relays is disclosed in U.S. Pat. No. 4,205,360.

SUMMARY OF THE INVENTION

The present invention is a baseband digital communication system operating over an electric power transmission line. The system transmits and receives digital data in baseband form at a rate of 600 kbits/second to 1.2 Mbits/second, or greater, from one transmission line terminal to another using the power transmission line as the communication channel. These baseband digital signals occupy a substantial portion of the 30 kHz to 300 kHz frequency band allocated for utility power-line communication. Typical EMS data may be carried by the system, including signals representing the status of various power network devices, and control signals from the EMS central computer to these devices. Also, the baseband system can be used to transmit protective-relaying signals.

The system includes a digital data pulse generator coupled to the transmission line for propagating a baseband digital signal, responsive to an information signal, over the transmission line. Connected at another location on the transmission line is a receiver responsive to the baseband digital signal for sampling it and for providing an output signal. To insure maximum signal strength and proper propagation of the baseband digital signal, the system also includes matching networks and line traps. Other devices insure that the signal occupies the proper frequency spectrum and compensate for transmission-line attenuation of various frequency components.

Compared to the leased telephone lines previously discussed, the baseband power-line communication system has several advantages. Since the transmission lines over which the baseband signals are sent are under utility control there are no rental charges. Unexpected communication channel interruptions and appearances of test signals on those channels are also non-existent. Due to a higher ratio of data rate to bandwidth used, a single baseband power line data link can carry the same data as between 100 and 400 leased telephone lines.

With respect to a microwave communication channel, the baseband system employs simpler, less costly equipment with lower maintenance costs, while conserving the microwave frequency spectrum. The baseband power-line system is also not subject to signal strength variations due to atmospheric conditions, and does not require installation or maintenance of repeaters in locations having difficult access, such as mountaintops.

Compared to a power-line carrier link used as a data transmission system, the baseband communication system disclosed herein offers several advantages. It retains the reliability and simplicity of a single carrier link, while handling as much data as 100 or more carrier transmitter-receiver pairs. Also, it is easier to apply, requires lower overall transmitter power, and obviates the adjacent-channel interference problems of the 100 or more carrier sets that it can replace.

If input and output links of the power-line baseband communication system are installed at a single substation, a portion of the baseband signal produced by the output link will be received by a distant receiver; another portion, an interference component, will be picked up, via the substation bus, by the receiver at the substation and will interfere with proper operation of that receiver. In addition to using signal traps to overcome this interference problem, the invention generates a mimic signal which is subtracted from the interference component to neutralize the interference component.

The power-line baseband digital commmunication system can be used in conjunction with certain conventional protective-relaying carrier communication systems operating over the same power-line conductors.

To accomplish this, the baseband digital signal is interrupted during short intervals of carrier system protective-relaying operation.

DESCRIPTION OF THE PREFERRED EMBODIMENT

Figure 1:
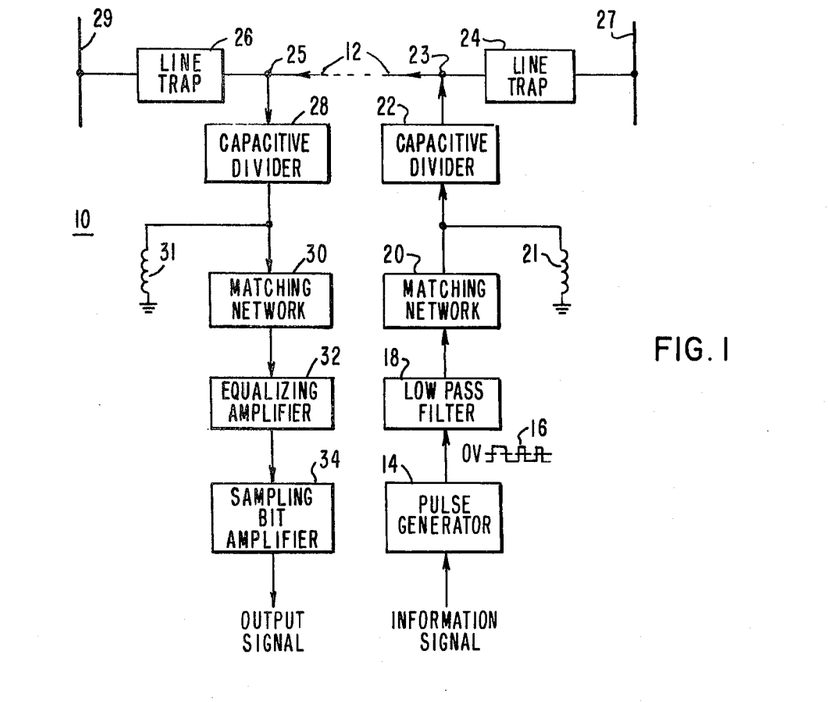
FIG. 1 is a block diagram of a power-line baseband communication system constructed according to the teachings of the present invention.

Turning to FIG. 1, there is shown a block diagram of a power-line baseband communication system 10 constructed according to the teachings of the present invention. The power-line baseband communication system 10 is coupled to a transmission line 12, connected between a local substation bus 27 and a remote substation bus 29, for transmitting data from a local substation (not shown), where the local substation bus 27 is located, to a remote substation (not shown), where the remote substation bus 29 is located.

An information signal is input to a pulse generator 14. A baseband digital signal 16, produced by the pulse generator 14, is serially processed through a lowpass filter 18, a matching network 20, and a capacitive divider 22. The capacitive divider 22 is connected to the transmission line 12 at a terminal 23. An input terminal of the capacitive divider 22 is connected to ground via a drain coil 21.

The power-line baseband communication system 10 uses the entire 30 kHz to 300 kHz frequency band presently allocated for power-line carrier service, achieving a typical data rate of 600 kbits/second to 1.2 Mbits/second. The spectrum of the baseband digital signal 16 is limited to this bandwidth by the low-pass filter 18 which has an upper cutoff frequency of approximately 300 kHz, and by the matching network 20 and the capacitive divider 22 which significantly attenuate frequency components below 30 kHz. The matching network 20, in cooperation with the capacitive divider 22, matches the nominal impedance of the pulse generator 14 to the characteristic impedance of the transmission line 12 over the 30 kHz-300 kHz band.

The baseband digital signal 16 can propagate over the transmission line 12 in a number of natural signal modes equal to the number of conductors constituting the transmission line 12. Matching the pulse generator 12 to the characteristic impedance of the transmission line 12 must be accomplished in a manner that maximizes propagation of that mode most favorable to efficient transmission of the baseband digital signal 16. See the discussion of modal coupling hereinbelow.

The capacitive divider 22 provides an ac signal to a terminal not shown in FIG. 1 for power-voltage monitoring and protective-relaying purposes. The drain coil 21 is an RF choke which shorts 60 Hz ac voltages to ground thereby preventing their entry into the pulse generator 14, the low-pass filter 18, and the matching network 20.

The baseband digital signal 16 is propagated from the terminal 23 along the transmission line 12 to a terminal 25. A line trap 24 and a line trap 26 confine the baseband digital signal 16 to that portion of the transmission line 12 between the terminals 23 and 25. In addition, the line trap 24 and the line trap 26 prevent other baseband digital signals from entering the transmission line 12 via other transmission lines (not shown) connected to the local substation bus 27 or the remote substation bus 29.

Connected to the transmission line 12 at the terminal 25 is a capacitive divider 28. The capacitive divider 28 couples the baseband signal 16 from the transmission line 12 and also provides a stepdown of the transmission line voltage for measurement by the protective relays (not shown). An output terminal of the capacitive divider 28 is connected to an input terminal of a matching network 30 and connected to ground via a drain coil 31. An output terminal of the matching network 30 is connected to an input terminal of an equalizing amplifier 32; an output terminal of the equalizing amplifier 32 is connected to an input terminal of a sampling bit detector 34.

The matching network 30, in conjunction with the capacitive divider 28, matches the nominal impedance of the sampling bit detector 34 to the characteristic impedance of the transmission line 12 over the 30 kHz to 300 kHz frequency band. As previously discussed, this impedance matching must maximize propagation of that signal mode providing most efficient transmission of the baseband digital signal 16. See the modal coupling discussion hereinbelow.

The capacitive divider 28 provides an ac signal to a terminal not shown in FIG. 1 for power-voltage monitoring and protective-relaying purposes. The drain coil 31 prevents 60 Hz ac voltages from entering the matching network 30. The equalizing amplifier 32 compensates for attenuation characteristics of the transmission line 12 by providing a signal gain which is a function of frequency. From 0 Hz to 30 kHz the equalizing amplifier 32 has zero gain. Utilizing quantized feedback (to be discussed in conjunction with FIG. 2), the sampling bit detector 34 samples the incoming signal to detect the sequence of received data bits and provides an output signal.

The power-line baseband communication system 10 can easily be incorporated onto any single or three-phase transmission line of the utility's power grid. Also, if a relatively clean (i.e., free from transformers and excessive branching) length of distribution line is available the power line baseband communication system 10 can be utilized on it. In one embodiment of the power-line baseband communication system 10 the pulse generator 14 has a power output of typically 1 watt to 100 watts; the actual power output is dependent upon the length of the transmission line 12 from the pulse generator 14 to the sampling bit detector 34, the method of digital coding utilized, the expected noise power on the transmission line 12, and the physical construction (e.g.

insulation and conductor spacing) of the transmission line 12 as dictated by the voltage the transmission line 12 must carry.

When the power-line baseband communication system 10 is coupled to a three-phase transmission line there are three natural modes of propagation for the baseband digital signal 16. In each of the three propagation modes a specific signal vector and phase is present on each of the three conductors. The signal magnitude is a multiple of a normalized magnitude; the vector sum for all conductors in each mode equals zero. Also, each mode has its own attenuation per unit length of transmission line, propagation velocity, and characteristic or surge impedance. Using a horizontally-configured, three phase power line having uniform conductor spacing as an example, Table 1 shows approximate vector quantities and phases for each mode. "X" in Table 1 represents the normalized signal magnitude.

TABLE 1

| Transmission Line Conductor | Phase | Mode 1 | Mode 2 | Mode 3 |
|---|---|---|---|---|
| 1 | a | X | X | X |
| 2 | b | −2X | 0 | X |
| 3 | c | X | −X | X |

In mode 3 the ground is used as the signal return path. Mode 1 propagation experiences the lowest loss, mode 3 the greatest.

When coupling the baseband digital signal 16 to the transmission line 12 significant amounts of all modes will be propagated over the transmission line 12. The mode 3 signal will be severely attenuated during transmission and therefore will not cause an interference problem at the sampling bit detector 34. However, both the mode 1 and mode 2 signals will reach the sampling bit detector 34, the latter experiencing some attenuation during transmission. Since the mode 1 signal propagates more slowly, the two modes experience a relative phase shift, dependent on frequency, over the length of the transmission line 12. At the sampling bit detector 34 the mode 1 and mode 2 signals may add or cancel producing large attenuation-versus-frequency fluctuations when measured on one phase conductor.

To avoid these attenuation swings, a coupling transformer (not shown) should be used at the terminal 25. The coupling transformer insures that only one mode 1 components reach the sampling bit detector 34. A coupling transformer (not shown) at the terminal 23 prevents propagation of mode 2 and 3 components, although these may arise due to changes in physical configuration along the transmission line 12 between terminals 23 and 25.

Figure 2:
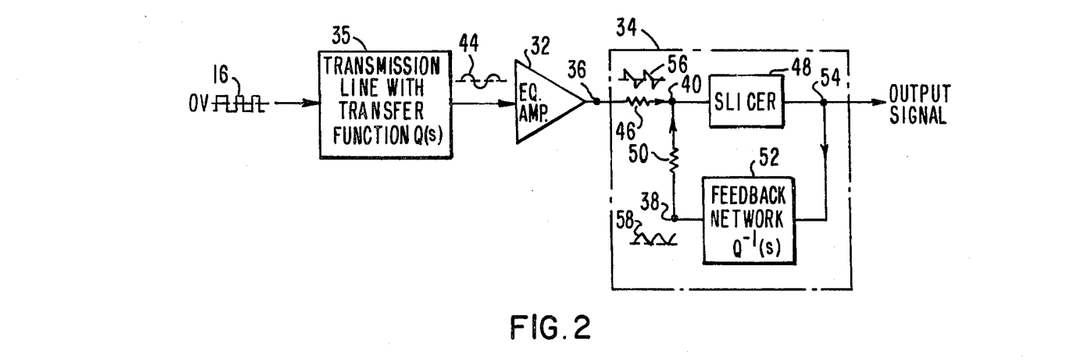
FIG. 2 is an electrical schematic of a quantized feedback circuit for use with the power-line baseband communication system of FIG. 1.

FIG. 2 shows the quantized feedback network of the sampling bit detector 34. The low frequency limit of the transmission channel is 30 kHz as previously discussed. This is 10% of the upper cutoff frequency (i.e., 300 kHz) and cannot be lowered due to the cost of increasing the capacitance of the capacitive dividers 22 and 28, the ineffectiveness of the line traps 24 and 26 at lower frequencies, and the rapid increase in received noise power at frequencies below 30 kHz. Baseband data transmission normally requires a channel having a frequency response down to zero frequency (i.e., dc). The transmission channel's lack of a zero frequency low-frequency cutoff causes severe base-line or low-frequency wander of the baseband digital signal 16 as it is carried over the transmission line 12. This wander introduces uncertainty in the level of the baseband digital signal at the sampling bit detector 34 and therefore causes an increase in the number of sampling errors. Quantized feedback, which is known in the art, is utilized in the sampling bit detector 34 to overcome this low-frequency wander by inserting into the baseband digital signal 16 low-frequency energy not propagated by the transmission line 12 but needed for error-free detection of the baseband digital signal 16.

In the quantized feedback network of FIG. 2 the baseband digital signal 16 is input to a block 35. The block 35 represents the transmission line 12, the matching networks 20 and 30, and the capacitive dividers 22 and 28, wherein these components have a cumulative transfer function $Q(s)$. Low-frequency and dc components of the baseband digital signal 16 are severely attenuated by $Q(s)$. An output terminal 36 of the equalizing amplifier 32 is connected to an input terminal 40 of a slicer 48 via a resistor 46. An output terminal 54 of the slicer 48 is connected to a feedback network 52 having a transfer function $Q^{-1}(s)$. An output terminal 38 of the feedback network 52 is connected to the input terminal 40 of the slicer 48 via a resistor 50. The resistor 46, the slicer 48, the resistor 50, and the feedback network 52 constitute the sampling bit detector 34.

Figure 3:
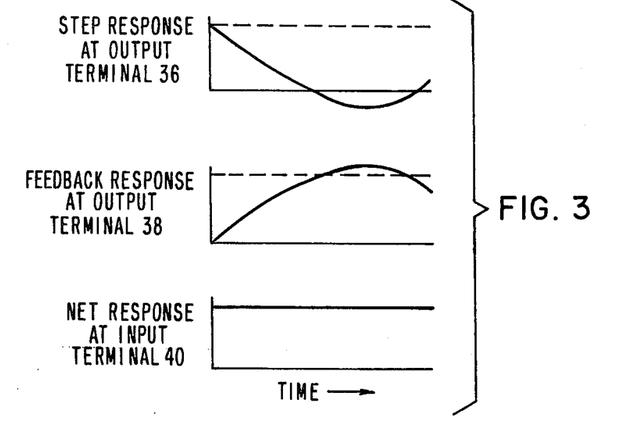
FIG. 3 is a pictorial representation of the step response of the quantized feedback circuit components of FIG. 2.

The quantized feedback network functions as follows. The equalizing amplifier 32 compensates for frequency attenuation characteristics of the transmission line 12 within the permissible transmission band (e.g. 30–300 kHz), and in response to a received baseband digital signal 44 produces an equalized signal 56. FIG. 3 illustrates the step response of the equalizing amplifier 32 at the output terminal 36 thereof. The step response decays rapidly due to the absence of low-frequency energy, i.e., below 30 kHz. The equalized signal 56 is input to the slicer 48 which is a threshold detector and detects the initial appearance of a mark, i.e., a pulse representing a binary one. In response to the signal at the output terminal 54 the feedback network 52 produces a feedback signal 58 providing the absent low frequency energy. The step response of the feedback network, i.e., at the output terminal 38, is illustrated in FIG. 3; note the significant low frequency content of this waveform. Since the feedback network 52 has a transfer function which is an inverse of the transfer function $Q(s)$, the feedback signal 58 is complementary to the equalized signal 56. The equalized signal 56 and the feedback signal 58 are summed at the input terminal 40. The net reponse at the input terminal 40 is also illustrated in FIG. 3. Therefore, the output signal of the slicer 48 is representative of the baseband digital signal 16, and holds the input terminal 40 at the mark level via the feedback network 52.

To summarize, as can be seen from FIG. 3 the step response at the output terminal 36 decays due to the absence of low-frequency energy (i.e., below 30 kHz) not propagated over the transmission line 12. The feedback network 52 compensates for the lack of this low-frequency energy by providing a feedback signal 58 with rising voltage complementary to the aforementioned decay. When the feedback signal 58 and the equalized signal 56 are added to the input terminal 40 a response more closely resembling an ideal step is obtained. The output signal will therefore closely resemble the baseband digital signal 16.

When the equalized signal 56 experiences a negative transition the feedback signal 58 is interrupted. The equalized signal 56 will hold the voltage at the input terminal 40 low long enough for the feedback signal 58 to decay to zero at which point the output remains at binary zero. The cycle begins again when the equalized signal 56 experiences another positive transition.

Although the quantized feedback network has been explained using a pulse input, it is capable of responding to digital sequences utilizing various encoding schemes.

Figure 4:
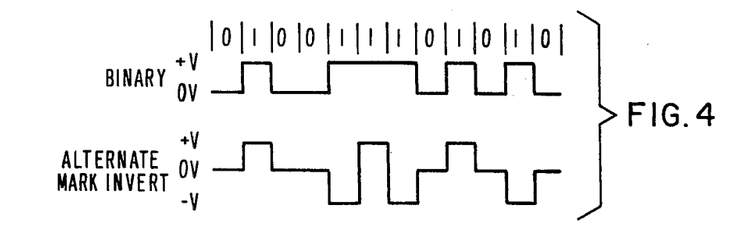
FIG. 4 is a pictorial representation of two exemplary digital coding schemes for the power-line baseband communication system of FIG. 1.

One feature of the present invention is the suggested use of an alternate mark invert (or bipolar) digital code for the information signal of FIG. 1. The significance of this coding scheme can be better understood by reference to FIG. 4 and FIG. 5. FIG. 4 illustrates the binary and the alternate mark invert encoding schemes for a series of binary digits. As can be seen, in the binary scheme a binary zero is represented by a zero volt signal and a binary one by a positive voltage signal. In the alternate mark invert scheme all binary zeros are again represented by zero volts, however, binary ones are represented by both positive and negative voltages. The first binary one is represented by a positive voltage, and the second binary one is represented by a negative voltage. The third binary one is again represented by a positive voltage. The sequence continues in this manner with the voltage level alternating between a positive and negative value for consecutive binary ones.

Figure 5:
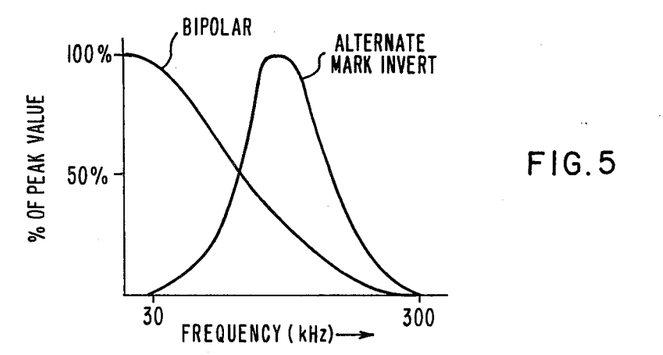
FIG. 5 is a graph of the power frequency spectrum for each of the digital coding schemes shown in FIG. 4.

The power spectra for the binary and alternate mark invert coding schemes are shown in FIG. 5. Note that the power spectrum for the binary scheme is centered at 0 Hz and the majority of the energy in the binary coded signal resides in the frequency band of approximately 0 Hz to 120 kHz. This is due to the significant dc component of a binary coded signal. Because an alternate mark invert signal alternates between a positive voltage and a negative voltage the dc component is effectively cancelled. The resulting power spectrum is shown in FIG. 5; the majority of the energy in an alternate mark invert coded signal is in the 30 kHz to 300 kHz band. Since, for reasons previously discussed, a preferred embodiment of the power line baseband communication system 10 utilizes the 30 kHz to 300 kHz frequency band, the alternate mark invert coding system is ideally suited for use with the power line baseband communication system 10. Choice of the alternate mark invert signalling format also minimizes the operating range of the quantized feedback circuit of FIG. 2, rendering the design of that circuit less critical.

To this point, the power-line baseband system communication system 10 has been described in its basic form. Other embodiments of the power-line baseband system 10 are disclosed hereinafter. The first alternate embodiment eliminates interference problems caused when both an incoming and outgoing link of the power-line baseband communication system 10 are installed at the same substation. The second and third alternate embodiments permit use of both a power-line carrier system and the power-line baseband communication system 10 on the same transmission line 12.

Figure 6:
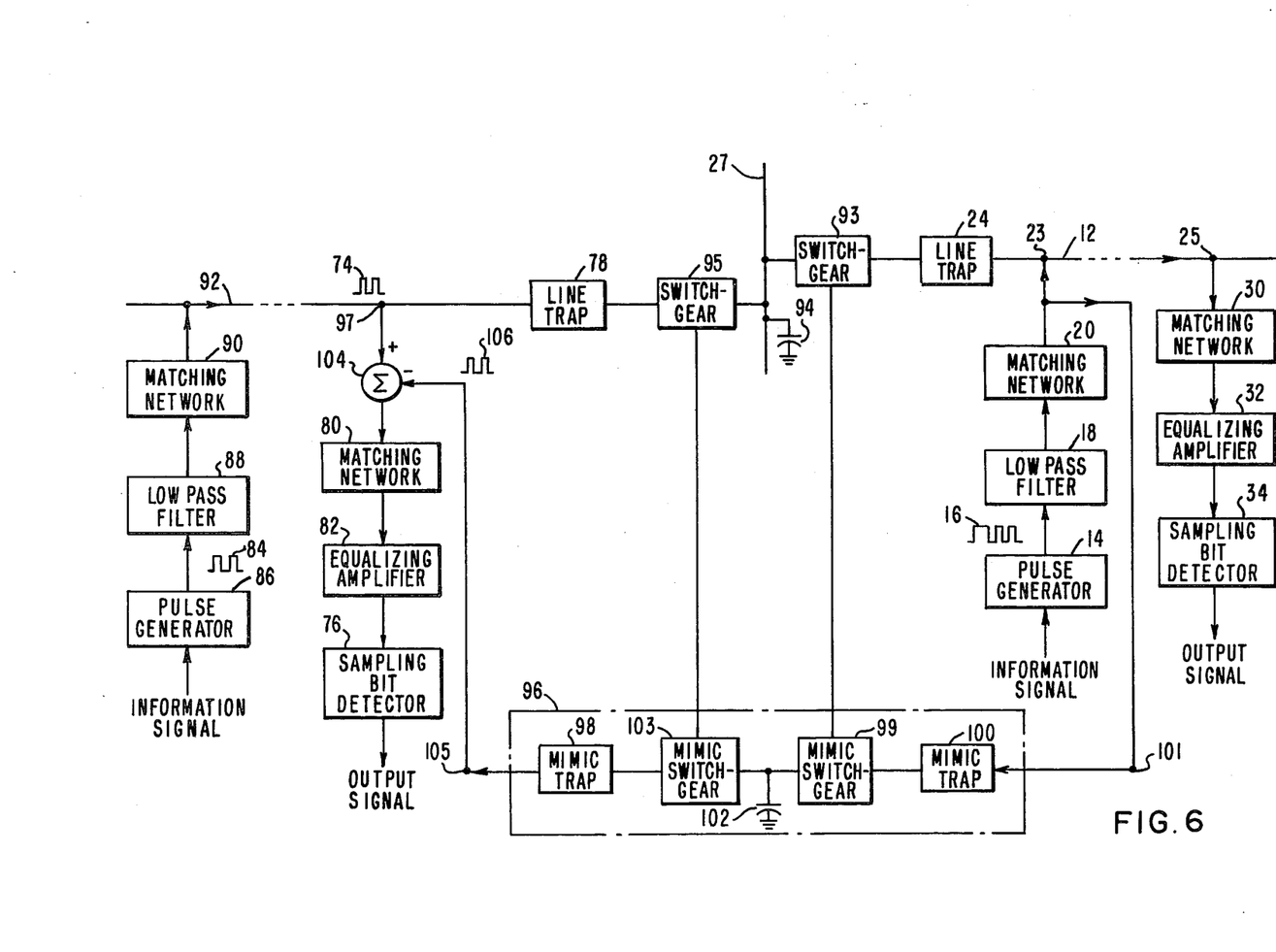
FIG. 6 is a block diagram of an interference-neutralization network for use with the power-line baseband communication system of FIG. 1.

When both incoming and outgoing links of the power-line baseband communication system 10 are installed in a single substation, the outgoing signal may be coupled to the incoming link through the local substation bus 27 (or the remote substation bus 29) of FIG. 1. FIG. 6 illustrates this problem and a scheme to overcome it. The components of FIG. 6 are identical in structure and function to the components bearing identical reference characters in FIG. 1.

As discussed in conjunction with FIG. 1, the baseband digital signal 16, produced by the pulse generator 14, is propagated over the transmission line 12 to the sampling bit detector 34. Referring to FIG. 6, despite the use of the line trap 24, an interference signal component 74 of the baseband digital signal 16 is erroneously coupled to a sampling bit detector 76 via the line trap 24, a switchgear 93, the substation bus 27, a switchgear 95, a line trap 78, a matching network 80, and an equalizing amplifier 82. Of course, it is intended that the sampling bit detector 76 receive a baseband digital signal 84 from a pulse generator 86, via a low-pass filter 88, a matching network 90, the transmission line 92, the matching network 80, and the equalizing amplifier 82. If the interference signal component 74 reached the sampling bit detector 76 the interference signal component 74 would interfere with proper detection of the baseband digital signal 84.

The switchgear 93 is a switching assembly which connects and disconnects the transmission line 12 from the local substation bus 27. The switchgear 95 functions identically with respect to a transmission line 92.

To neutralize the interference signal component 74, the baseband digital signal 16 is passed through a physically small mimic network 96. The mimic network 96 mimics the electrical behavior, in the frequency range of 30 kHz to 300 kHz, of the line trap 24, the switchgear 93, the substation bus 27, the switchgear 95, the line trap 78, and a bus capacitance 94. The mimic network 96 comprises a series configuration of a mimic trap 100, a mimic switchgear 99, a mimic switchgear 103, and a mimic trap 98 connected between an input terminal 101 of the mimic network 96 and an output terminal 105 of the mimic network 96. The junction between the mimic trap 98 and the mimic trap 100 is connected to ground via a mimic capacitor 102. The mimic switchgear 99 is controlled by the switchgear 93 such that when the switchgear 93 is open the mimic switchgear 99 is also open, and when the switchgear 93 is closed the mimic switchgear 99 is closed. The switchgear 95 and the mimic switchgear 103 function in an identical manner.

The input terminal 101 of the mimic network 96 is connected to an output terminal of the matching network 20 and the output terminal 105 of the mimic network 96 is connected to a negative input terminal of a summer 104. A positive input terminal of the summer 104 is connected to the transmission line 92 at a terminal 97. An output terminal of the summer 104 is connected to an input terminal of the matching network 80. The mimic network 96 produces a mimic signal 106 identical to the interference signal component 74. The summer 104 subtracts the mimic signal 106 from the interference signal component 74 thereby cancelling the interference signal component 74. It is unnecessary to mimic the electrical behavior of the transmission line 12 and the transmission line 92 because the transmission line 12 and the transmission line 92 have little effect on the interference signal component 74.

In an installation where both the power-line baseband communication system 10 and a power-line carrier system utilize the transmission line 12 it is necessary to discontinue operation of the power-line baseband communication system 10 when the power-line carrier system is operating. Use of the entire 30 kHz to 300 kHz communication band by the power-line baseband communication system 10 precludes simultaneous operation. Instantaneous interruption of the power-line baseband communication system 10 is especially critical when the power-line carrier system is used for transmission of protective-relaying signals, a common use of the power-line carrier system today. Of course, since the power-line baseband communication system 10 can be used in lieu of a power-line carrier system, the power-line baseband communication system 10 can be used for transmission of protective-relaying signals, in addition to EMS signals, thereby supplanting the power-line carrier.

The second and third alternate embodiments of the power-line baseband communication system 10 disclose a scheme in which the protective relaying signal interrupts the power-line baseband communication system 10 when it is necessary to transmit the protective-relaying signal via the power-line carrier system. Protective-relaying communications are, however, of short duration, usually hundreds of milliseconds. Use of redundant links, periodically repeated data transmission, and error detecting and correcting codes for the power-line baseband communication 10 minimize the deleterious effect of this interruption on the baseband digital signal 16.

Figure 7:
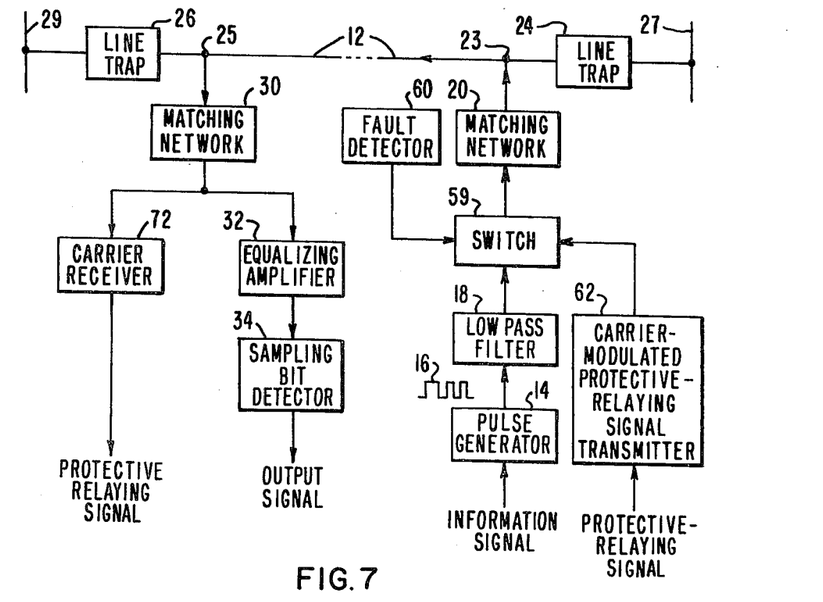
FIG. 7 is a block diagram of a channel seizure network for shared use of carrier-protective-relaying systems and the power-line baseband communication system of FIG. 1.
Figure 8:
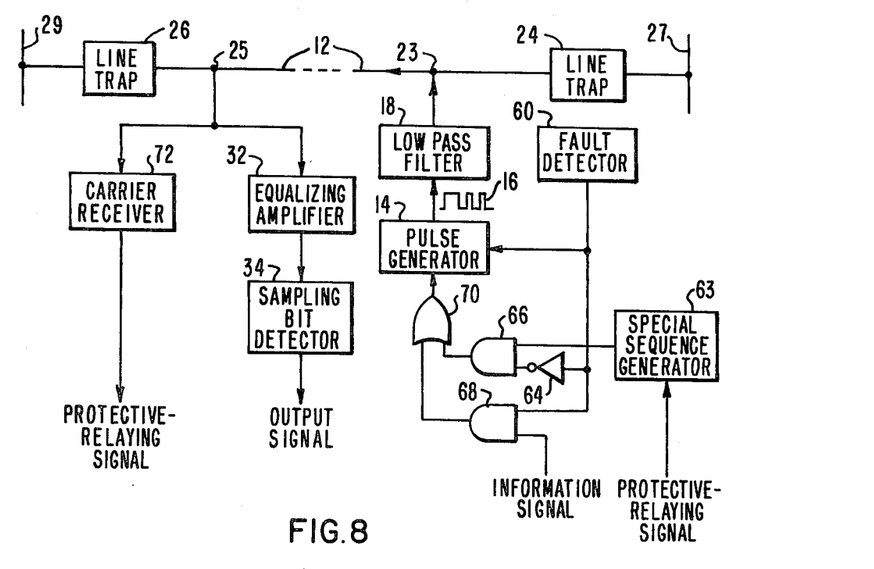
FIG. 8 is an alternate embodiment of the channel seizure network of FIG. 7.

FIGS. 7 and 8 illustrate, respectively, the second and third alternate embodiments of the power-line baseband communication system 10; the components of FIGS. 7 and 8 are identical in structure and function to the components bearing identical reference characters in FIG. 1. Turning first to FIG. 7, an output terminal of a fault detector 60, responsive to disturbances in 60 Hz voltage or current, is connected to a first input terminal of a switch 59. A second input terminal of the switch 59 is connected to an output terminal of the low-pass filter 18; a third input terminal of the switch 59 is connected to an output terminal of a carrier-modulated protective-relaying signal transmitter 62. The protective-relaying signal transmitter 62 produces a carrier-modulated signal using either on-off or frequency-shift keying.

Operation of the system is as follows. When the protective-relaying system, and hence the power-line carrier system, is inoperative an output signal of the fault detector 60 controls the switch 59 such that the baseband digital signal 16 passes through the switch 59 and the matching network 20 and is then propagated over the transmission line 12. The baseband digital signal 16 is sampled by the sampling bit detector 34 as discussed in conjunction with FIG. 1. When a fault is detected, the output signal of the fault detector 60 switches the switch 59 such that a carrier-modulated protective-relaying signal, from the protective-relaying signal transmitter 62, is carried by the transmission line 12.

A carrier receiver 72, which is well known in the art, is connected to the transmission line 12 via the matching network 30. The carrier receiver 72 responds either to a single frequency (when on-off keying is used) or to a pair of closely spaced frequencies (when frequency-shift keying is used). In either case, the gain of the carrier receiver 72 is set to respond (within the narrow bandwidth of the carrier receiver 72) to a signal level several decibels above that normally produced by the power-line baseband communication system 10. Therefore, the carrier receiver 72 is not responsive to the baseband digital signal 16. When a fault occurs, the carrier receiver 72 detects the much larger carrier-modulated protective-relaying signal to which it is tuned, demodulates the carrier signal, and communicates with the protective relay equipment (not shown) in a manner well known in the art.

It is customary in present-day frequency-shift-keyed systems to continuously operate the FSK transmitter at a first frequency at all non-fault times. This is done to monitor channel integrity. When a fault occurs the FSK transmitter shifts to a second frequency. Use of the second embodiment of the power-line baseband communication system 10 with an FSK transmitter precludes, and renders unnecessary, transmitter operation at the first frequency. Channel integrity is demonstrated by successful operation of the power-line baseband communication system 10.

Turning now to FIG. 8, a third embodiment is illustrated. An output terminal of the fault detector 60 is connected to an input terminal of an inverter 64; an output terminal of the inverter 64 is connected to a first input terminal of an AND gate 66. An output terminal of a special sequence generator 63 is connected to a second input terminal of the AND gate 66. The output terminal of the fault detector 60 is also connected to a first input terminal of an AND gate 68; an information signal is connected to a second input terminal of the AND gate 68. An output terminal of the AND gate 66 is connected to a first input terminal of an OR gate 70; an output terminal of the AND gate 68 is connected to a second input terminal of the OR gate 70. An output terminal of the OR gate 70 is connected to a first input terminal of the pulse generator 14. The output terminal of the fault detector 60 is also connected to a second input terminal of the pulse generator 14.

In operation, when the protective-relay system, and hence the power-line carrier system, is inoperative the output terminal of the fault detector 60 is high thereby enabling the AND gate 68 such that the information signal passes through the AND gate 68 and the OR gate 70 to the first input terminal of the pulse generator 14. The pulse generator 14 produces the baseband digital signal 16 which is carried by the transmission line 12 as discussed in conjunction with FIG. 1. In this mode of operation, the AND gate 66 is disabled due to the low voltage, provided by the inverter 64, at the second input terminal of the AND gate 66.

When a fault is detected, the output terminal of the fault detector 60 changes to a low state thereby enabling the AND gate 66 and disabling the AND gate 68. A protective-relaying logic signal from the special sequence generator 63 is now coupled to the first input terminal of the pulse generator 14 via the AND gate 66 and the OR gate 70. The protective-relaying logic signal produced by the special sequence generator 63 is an alternating, square wave, logic-level signal of a frequency to which the carrier receiver 72 is responsive. The resultant pulse sequence at the output terminal of the pulse generator 14 contains frequency components of the alternation frequency and harmonics thereof, but the bulk of the power is concentrated at the alternation frequency. The low-pass filter 18 attenuates the harmonics and rounds the corners of the square waves of the pulse sequence produced by the pulse generator 14. Therefore, in this mode of operation a signal propagated by the transmission line 12 resembles a sinusoidal carrier suitable for detection and demodulation by the carrier receiver 72. Also, all the output power of the pulse generator 14 normally distributed over the 30–300 kHz band is now concentrated at the sinusoidal-carrier frequency. This increases the signal level at this frequency by several decibels and activates the carrier receiver 72 as in the previous embodiment.

The low state at the output terminal of the fault detector 60 is also coupled to the second input terminal of the pulse generator 14. This causes the output power of the pulse generator 14 to increase above the normal continuous level during the short interval when the special sequence generator 63 is operative. Such a power boost further differentiates the magnitude of the sinusoidal-carrier signal from the baseband digital signal In operation, an incoming and an outgoing link of the power-line baseband communication system 10 are located at each transmission-line substation. Information can then be transmitted long distances, spanning many such transmission-line substations, by successive transmission and reception at each substation. Redundancy in the transmission line network also provides redundant signal paths for the power-line baseband communication system 10. Packet-switching methods used in the telecommunications industry may be employed to route messages between a master station and many substations.

The many advantages of the power line baseband communication system 10 can now be appreciated. The power-line baseband communication system 10 utilizes an existing and reliable transmission medium, i.e., the utility's transmission lines connected in a redundant network. Compared to microwave communications, the power line baseband communication system 10 offers greater reliability, lower installation costs, and far less maintenance. Further, performance is not dependent upon terrain or atmospheric anomalies nor are repeaters necessary for transmission lines up to 100 or more miles long.

The power-line baseband communication system 10 is also more reliable than communication via leased telephone channels. One link of a power line baseband communication system 10 can provide the capacity of approximately 100 to 400 such telephone channels. There are no continuing rental charges with the power-line baseband communication system 10, and all the equipment is under utility control, and thus not subject to unexpected interruptions or tests.

If a power-line carrier system occupied the entire 30 kHz-300 kHz spectrum, as does the power-line baseband communication system 10, there would be sufficient space for 90 carrier data signals spaced at 3 kHz intervals. But, the power-line baseband communication system 10 provides approximately five times the digital data capacity of these 90 channels at a comparable to far lower total transmitter power requirement. Further, the savings in equipment complexity are considerable. It is even possible to achieve higher data signalling rates using more exotic coding methods for the pulse generator 14. It is also possible to provide dedicated voice-service channels on the power-line baseband communication system 10 at a sacrifice of digital signalling speed.

Briefly reviewing, there has been disclosed a baseband communication system for communication over electrical power lines. The transmission of digital signals is achieved by applying baseband pulses directly to the power line. This scheme offers much higher data rate capacity with simpler and more reliable equipment than any modulated-carrier scheme performing the same function. To avoid interference when both receiving and transmitting links of the baseband system are installed at the same substation a device is disclosed for producing a mimic signal identical to the interference signal and for subtracting the mimic signal from the interference signal at the substation. Provisions are also provided for interrupting baseband communication when it is necessary to transmit a modulated-carrier signal on the same power line.

What is claimed is:

1. A power-line data system for conveying communication signals over a power-line conductor having a characteristic line transfer function, said power-line data system comprising:
   means for producing a digital information signal having a plurality of zero and one bits;
   pulse generator means being adapted for coupling to said power-line conductor at a first location, said pulse generator means for propagating a baseband digital signal representative of said digital information signal over said power-line conductor wherein said baseband digital signal has a first, a second, and a third state, and wherein each one of the plurality of binary zero bits is represented by said first state, and wherein a first bit of two consecutive bits of the plurality of binary one bits is represented by said second state, and wherein a second bit of two consecutive bits of the plurality of binary one bits is represented by said third state; and
   sampling bit detector means being adapted for coupling to said power-line conductor at a second location, for receiving said baseband digital signal, and for producing an output signal in response thereto.

2. The power-line data system of claim 1 wherein the first state is represented by zero voltage, the second state is represented by a positive voltage, and the third state is represented by a negative voltage.

3. The power-line data system of claim 1 wherein the baseband digital signal has a power frequency spectrum between a lower cutoff frequency and a higher cutoff frequency.

4. The power-line data system of claim 3 wherein the lower cutoff frequency is 30 kHz and the higher cutoff frequency is 300 kHz.

5. The power-line data system of claim 1 wherein a plurality of propagational modes of the baseband digital signal are transmitted over the power-line conductor and wherein said plurality of propagational modes interfere with each other.

6. The power-line data system of claim 5 including coupling transformer means disposed between the pulse generator means and the power-line conductor at the first location, said coupling transformer means for insuring only a one of the plurality of propagational modes is transmitted over the power-line conductor.

7. The power-line data system of claim 5 including coupling transformer means disposed between the sampling bit detector means and the power-line conductor at the second location, said coupling transformer means for insuring only a one of the plurality of propagational modes is received by the sampling bit detector means.

8. The power-line data system of claim 1 including low-pass filter means disposed between the pulse generator means and the power-line conductor at the first location, said low-pass filter means for filtering the baseband digital signal prior to propagation over the power-line conductor.

9. The power-line data system of claim 1 including equalizing amplifier means disposed between the sampling bit detector means and the power-line conductor at the second location said equalizing amplifier means being adapted for producing a frequency-equalized signal in response to the baseband digital signal.

10. The power-line data system of claim 9 wherein a gain of the equalizing amplifier means is dependent on frequency such that the equalizing amplifier means compensates for frequency attenuation characteristics of the power-line conductor.

11. The power-line data system of claim 9 wherein the sampling bit detector means includes slicer means, said slicer means including feedback means having a transfer function bearing an inverse relationship to the characteristic line transfer function, said slicer means responsive to the frequency-equalized signal for producing a feedback signal, such that low frequency components of the baseband digital signal not propagated over the power-line conductor are reinserted into the baseband digital signal by cooperation of said feedback signal and the frequency-equalized signal.

12. A power-line data system for conveying communication signals over a first and a second power transmission line, said first and said second transmission lines connected together at a power bus, said power line data system comprising:
first pulse generator means being adapted for coupling to said first transmission line for propagating a first baseband digital signal in response to a first information signal over said first transmission line, wherein said first baseband digital signal has a primary component and a run-around component;
first sampling bit detector means being adapted for coupling to said first transmission line for receiving said primary component of said first baseband digital signal and for producing a first output signal in response thereto;
second pulse generator means being adapted for coupling to said second transmission line for transmitting a second baseband digital signal in response to a second information signal;
second sampling bit detector means being adapted for coupling to said second transmission line for receiving said second baseband digital signal and for producing a second output signal in response thereto, and wherein said run-around component of said first baseband digital signal is coupled to said second sampling bit detector means via said power bus, such that said run-around component interferes with proper detection of said second baseband digital signal.

13. The power-line data system of claim 12 including signal neutralization means for canceling the run-around component of the first baseband digital signal.

14. The power-line data system of claim 13 wherein the signal neutralization means includes mimic network means responsive to the first baseband digital signal for producing a mimic signal identical to the run-around component of the first baseband digital signal, and wherein the second sampling bit detector means is responsive to said mimic signal.

15. The power-line data system of claim 14 including subtraction means responsive to the mimic signal and the run-around component, said subtraction means for subtracting the mimic signal from the run-around component, wherein the second sampling bit detector means is responsive to said subtraction means such that the run-around component is neutralized by said subtraction means.

16. The power-line data system of claim 1 including a power-line carrier communication system for interrupting operation of said power-line data system and for conveying a carrier-modulated signal over the power-line conductor.

17. The power-line data system of claim 1 wherein the power-line conductor includes a power transmission line.

18. The power-line data system of claim 17 including a power-line carrier communication system for interrupting operation of the power-line data system and for conveying a carrier-modulated protective relay signal over the transmission line when a fault occurs on the transmission line.

19. The power-line data system of claim 18 wherein the protective relay signal includes a frequency-shift keyed modulated carrier signal having a plurality of predetermined frequencies and a modulating information signal.

20. The power-line data system of claim 18 wherein the protective relay signal includes an on-off keyed modulated carrier signal having a predetermined frequency and a modulating information signal.

21. The power-line data system of claim 18 wherein the power-line carrier communication system includes protective-relay transmitter means for producing the protective-relay signal in response to a protective relay.

22. The power-line data system of claim 18 wherein the power-line carrier communication system includes receiver means being adapted for coupling to the transmission line at the second location and for receiving the protective-relay signal.

23. The power-line data system of claim 18 wherein the power-line carrier communication system includes fault detector means for detecting the fault on the transmission line and for producing an enable signal in response to the fault, said enable signal having a first state and a second state.

24. The power-line data system of claim 23 wherein the power-line carrier communication system includes switching means responsive to the enable signal and selectably responsive to the baseband digital signal and to the protective relay signal, said switching means being adapted for coupling to the power transmission line, such that when the enable signal is in the first state said switching means is responsive to the baseband digital signal and when the enable signal is in the second state said switching means is responsive to the protective-relay signal.

25. The power line data system of claim 17 including a power-line carrier communication system for interrupting operation of the power-line data system and for conveying a protective-relay signal over the transmission line when a fault occurs on the transmission line, said protective-relay signal resembling a carrier-modulated signal.

26. The power-line data system of claim 25 wherein the power-line carrier communication system includes special sequence generator means for producing a first signal in response to a protective relay, the pulse generator means being selectably responsive to said first signal.

27. The power-line data system of claim 26 wherein the power-line carrier communication system includes fault detector means for detecting the fault on the transmission line and for producing an enable signal in response to the fault, said enable signal having a first state and a second state.

28. The power-line data system of claim 27 wherein the pulse generator means is responsive to the enable signal such that when the enable signal is in the first state the pulse generator means transmits at a first power level, and when the enable signal is in the second state the pulse generator means transmits at a second power level.

29. The power-line data system of claim 28 wherein the power-line carrier communication system includes switching means, said switching means selectably responsive to the information signal and to the first signal, and wherein the pulse generator means is responsive to said switching means such that the pulse generator means is responsive to the information signal for producing the baseband digital signal when the enable signal is in the first state, and the pulse generator means is responsive to the first signal for producing the protective-relay signal when the enable signal is in the second state.

30. The power-line data system of claim 29 wherein the switching means includes a first AND logic gate having a first input terminal being responsive to the information signal, a second input terminal being responsive to the enable signal, and an output terminal for producing a second output signal, said second output signal representative of the information signal when the enable signal is in the first state and having a zero value when the enable signal is in the second state, and wherein the pulse generator means is responsive to said second output signal when the enable signal is in the first state.

31. The power-line data system of claim 30 wherein the switching means includes a NOT logic gate having an input terminal being responsive to the enable signal and an output terminal for producing an inverted enable signal having a first and a second state, such that when the enable signal is in the first state said inverted enable signal is in said second state, and when the enable signal is in the second state said inverted enable signal is in said first state.

32. The power-line data system of claim 31 wherein the switching means includes a second AND logic gate having a first input terminal being responsive to the first signal, a second input terminal being responsive to the inverted enable signal, and an output terminal for producing a third output signal, said third output signal representative of the first signal when the inverted enable signal is in the first state and having a zero value when the inverted enable signal is in the second state, and wherein the pulse generator means is responsive to said third output signal when the inverted enable signal is in the first state.

33. The power-line data system of claim 32 wherein the switching means includes an OR logic gate having a first input terminal being responsive to the second output signal, a second input terminal being responsive to the third output signal, and an output terminal, and wherein the pulse generator means is responsive to said output terminal such that said pulse generator means transmits the protective-relay signal when the fault is present and transmits the baseband digital signal when the fault is not present.

34. The power-line data system of claim 29 wherein the power-line carrier communication system includes low-pass filter means disposed between the pulse generator means and the power transmission line at the first location.

35. The power-line data system of claim 29 wherein the power-line carrier communication system includes receiver means for coupling to the transmission line at the second location and for receiving the protective-relay signal.

36. A power-line data system for conveying communication signals over a power-line conductor having a characteristic line transfer function, said power-line data system comprising:
  means for producing a digital information signal having a plurality of zero and one bits;
  pulse generator means being adapted for coupling to said power-line conductor at a first location, said pulse generator means for propagating a baseband digital signal representative of said digital information signal over said power-line conductor, wherein said baseband digital signal has a first, a second, and a third state for representing said plurality of zero and one bits, such that the power frequency spectrum of said baseband digital signal is substantially between 30 kHz and 300 kHz; and
  sampling bit detector means being adapted for coupling to said power-line conductor at a second location, for receiving said baseband digital signal, and for producing an output signal in response thereto.

* * * * *